United States Patent [19]

Jabbari et al.

[11] Patent Number: 5,541,787
[45] Date of Patent: Jul. 30, 1996

[54] HEAD DISC ASSEMBLY WITH PRINTED CIRCUIT CABLE CONNECTOR ADAPTED FOR AUTOMATED ASSEMBLY

[75] Inventors: Iraj Jabbari, San Jose; Mike J. Darling, Soquel, both of Calif.

[73] Assignee: Seagate Technology, Inc., Scotts Valley, Calif.

[21] Appl. No.: 200,272

[22] Filed: Feb. 23, 1994

Related U.S. Application Data

[63] Continuation-in-part of Ser. No. 41,880, Apr. 2, 1993, Pat. No. 5,337,202, which is a continuation of Ser. No. 611,189, Nov. 9, 1990, abandoned.

[51] Int. Cl.$^6$ .......................... G11B 5/012; G11B 33/14; H01R 9/09; H02K 7/10
[52] U.S. Cl. .......................... 360/97.01; 360/97.03; 360/98.07; 360/99.08; 310/71; 310/DIG. 6; 439/67; 439/77; 439/271
[58] Field of Search .......................... 360/97.01, 98.01, 360/98.07, 99.08, 106, 108; 439/67, 74, 77, 271; 310/71, DIG.6

[56] References Cited

U.S. PATENT DOCUMENTS

| | | | |
|---|---|---|---|
| 4,639,863 | 1/1987 | Harrison et al. | 360/97.01 |
| 4,950,170 | 8/1990 | Miller, Jr. | 439/74 |
| 4,965,684 | 10/1990 | Stefansky | 360/97.01 |
| 5,256,922 | 10/1993 | Tanaka et al. | 310/71 |
| 5,257,941 | 11/1993 | Lwee et al. | 439/65 |
| 5,270,887 | 12/1993 | Edwards et al. | 360/106 |
| 5,313,128 | 5/1994 | Robinson et al. | 310/71 |

*Primary Examiner*—Stuart S. Levy
*Assistant Examiner*—Jefferson Evans
*Attorney, Agent, or Firm*—Gary S. Williams; Flehr, Hohbach, Test, Albritton & Herbert

[57] ABSTRACT

A flexible cable is supported within the sealed disc drive housing, with one end of the cable readily, automatically soldered to the end wires of the spindle motor leads. The opposite or outboard end of the cable terminates in a header comprising a plastic mounting piece to support a multi-pin electrical connector with the pins extending from both sides of the header. Two locating pins are provided on the plastic header outside of a channel for defining the location of a gasket. The conductors in the cable terminate at four connecting pins at one end of the header. With the pins extending both above and below the header piece, immediately upon installation of the printed cable, the conductors to the spindle motor may be accessed so that the spindle motor and other elements of the head disc assembly may be tested during assembly of the complete disc drive. The locating pins provided at opposite ends of the header allow the printed circuit cable and header to be quickly and automatically disposed on the base surface of the housing casting, with the locating pins being pushed into recesses in the base housing casting, and the connecting pins extending through an opening in the base housing casting so that wires may be attached thereto to interface the header to external circuits supported on the exterior of the housing. A gasket is located in the channel surrounding the pins on the header to seal the interior of the disc drive so that the contaminant-free nature of the interior of the housing is preserved.

8 Claims, 4 Drawing Sheets

HEAD DISC ASSEMBLY WITH PRINTED CIRCUIT CABLE CONNECTOR ADAPTED FOR AUTOMATED ASSEMBLY

CROSS-REFERENCE TO A RELATED APPLICATION

The present application is a continuation-in-part of application Ser. No. 08/041,880 filed Apr. 2, 1993, now U.S. Pat. No. 5,337,202; which is a continuation of application Ser. No. 07/611,189 filed Nov. 9, 1990, now abandoned, for Actuator PCC To PCB Mount by Jabbari and Phillips; the above are incorporated herein by reference.

FIELD OF THE INVENTION

The present invention relates to disc drive systems and particularly to apparatus for interfacing the spindle printed circuit cable to the control circuits mounted external to the disc drive casing.

BACKGROUND OF THE INVENTION

The present invention comprises apparatus for interfacing the spindle motor in a disc drive to control circuitry mounted external to the disc drive casing. Additionally, the inventive apparatus is intended to aid in maintaining the integrity of the clean room environment surrounding selected disc drive components which are located internal to the head disc assembly housing. Disc drive units in general are well known for use in modern microcomputers such as personal and desktop and personal notebook computers. In the most typical form, such disc drive units comprise a so-called Winchester disc drive having one or more rotatably driven memory storage discs mounted within a substantially sealed disc drive housing along with one or more related electromagnetic heads for reading and writing data on surfaces of the disc. A disc drive unit of this type, typically referred to as a hard or fixed disc, is normally available as a compact package including the sealed housing together with an external circuit board carrying the necessary drive electronics for controlling the rotation of the motor driving the discs and for controlling reading and writing data from the surface of the discs through the magnetic heads.

In this regard, the disc drive unit requires a power connector plug for supplying electrical power to the drive electronics on the circuit board, together with appropriate connector fittings for coupling the drive electronics with a suitable spindle motor for controlled rotational driving of the memory storage disc. Further, one or more interface connectors are normally provided for coupling the drive electronics to a computer system which supplies appropriate commands and data to the disc drive unit for reading and/or writing data.

In the past, assembly of a fixed disc drive unit in combination with the associated circuit board and the drive electronics thereon has been a relatively time consuming and labor intensive task, requiring considerable attention. More particularly, as one example, the spindle motor for the disc drive unit is commonly mounted within the substantially sealed disc drive housing, and is designed for multi-phase operations; thus a group of spindle motor leads must be individually connected by soldering or the like, to the drive electronics on the circuit board. These spindle motor leads protrude from the motor, typically at the underside thereof, and are normally soldered to respective terminals of a connector fitting adapted for plug-in engagement with a mating fitting on the circuit board.

Alternatively, in other cases, the spindle motor leads may be soldered to a multi-conductor cable which is coupled in turn to an associated connector fitting. In either case, however, connection of the spindle motor leads to the drive electronics required intensive manual effort, resulting in relatively slow and costly assembly of the disc drive units.

There have been previous efforts made to simplify this assembly process, as found in Bucknam U.S. Pat. No. 4,923,406. This patent discloses, as shown in FIG. 1, a cable leading from the underside of the housing to a connector to the drive electronics. The associated cable is designed to facilitate quick connections. However, in this case, all the spindle motor leads are brought outside the disc drive housing, and considerable manual labor is required.

There exists a significant need for improved apparatus and method for coupling the spindle motor leads of the disc drive to the associated drive electronics, wherein the improved method and apparatus provide for faster assembly of a disc drive unit by use of methods conducive to an automated assembly process.

SUMMARY OF THE INVENTION

In accordance with the present invention, an object of the invention is to provide a simplified apparatus for interfacing the spindle motor printed circuit cable with the externally mounted control and signal processing circuits.

A further objective of the invention is to provide means for mounting the printed circuit cable without the use of adhesives or other fixatives, so that the cable does not detract from the integrity of the sealed head disc assembly.

A further objective of the invention is to provide a simplified disc drive construction wherein cabling does not protrude from the drive. The inventive cable is intended to provide a sealed connector interface between the disc drive internal components and the external control and processing signal circuits. Yet another objective of the invention is to provide a simplified disc drive cabling apparatus whereby automated assembly of the disc drive head disc assembly is facilitated.

In summary, in accordance with the present invention, an improved spindle motor flexible cable is provided for use in a disc drive unit of the type used in personal desktop notebook computers and their like. The improved spindle motor flexible cable and its related installation method are especially adapted for automated assembly and provide for facilitated coupling of the disc drive spindle motor to the associated external drive electronics typically mounted external to the head disc assembly. The flexible cable is configured for ease of connection to a plurality of spindle motor leads at one end, and at the opposite end includes a connector fitting adapted for plug-in connection to drive electronics; the connector provides easy accessibility of the pins at the plug-in connector points so that testing of the spindle motor is also facilitated.

In the preferred form of the invention, the improved spindle motor flexible cable comprises a flexible ribbon cable base forming a substrate for a plurality of conductors supported thereon. The flexible cable is supported within the sealed disc drive housing, with one end of the cable defining a circular form presenting the ends of the connectors at defined locations thereon to be readily, automatically soldered to the end wires of the spindle motor leads. The opposite or outboard end of the spindle motor printed circuit cable terminates in a header comprising a plastic mounting piece of sufficient dimensions to support a multi-pin electrical connector with the pins extending from both sides of the header. Two locating pins are provided on the plastic header on the side which will face the base of the housing, adjacent and immediately outside of a channel for defining the location of a gasket. The conductors in the cable terminate at four connecting pins at one end of the header. With the pins extending both above and below the header piece, immediately upon installation of the printed cable, the conductors to the spindle motor may be accessed so that the spindle motor and other elements of the head disc assembly may be tested during assembly of the complete disc drive.

The locating pins provided at opposite ends of the header allow the printed circuit cable and header to be quickly and automatically disposed on the base surface of the housing casting, with the locating pins being pushed into recesses in the base housing casting, and the connecting pins extending through an opening in the base housing casting so that wires may be attached thereto to interface the header to external circuits supported on the exterior of the housing. A gasket is located in the channel surrounding the pins on the header to seal the interior of the disc drive so that the contaminant-free nature of the interior of the housing is preserved.

Other features and advantages of the present application will become more apparent from the following detailed description taken in conjunction with the following drawings which illustrate by way of example the principals of the invention.

DETAILED DESCRIPTION OF THE PREFERRED EMBODIMENT

Figure 2:
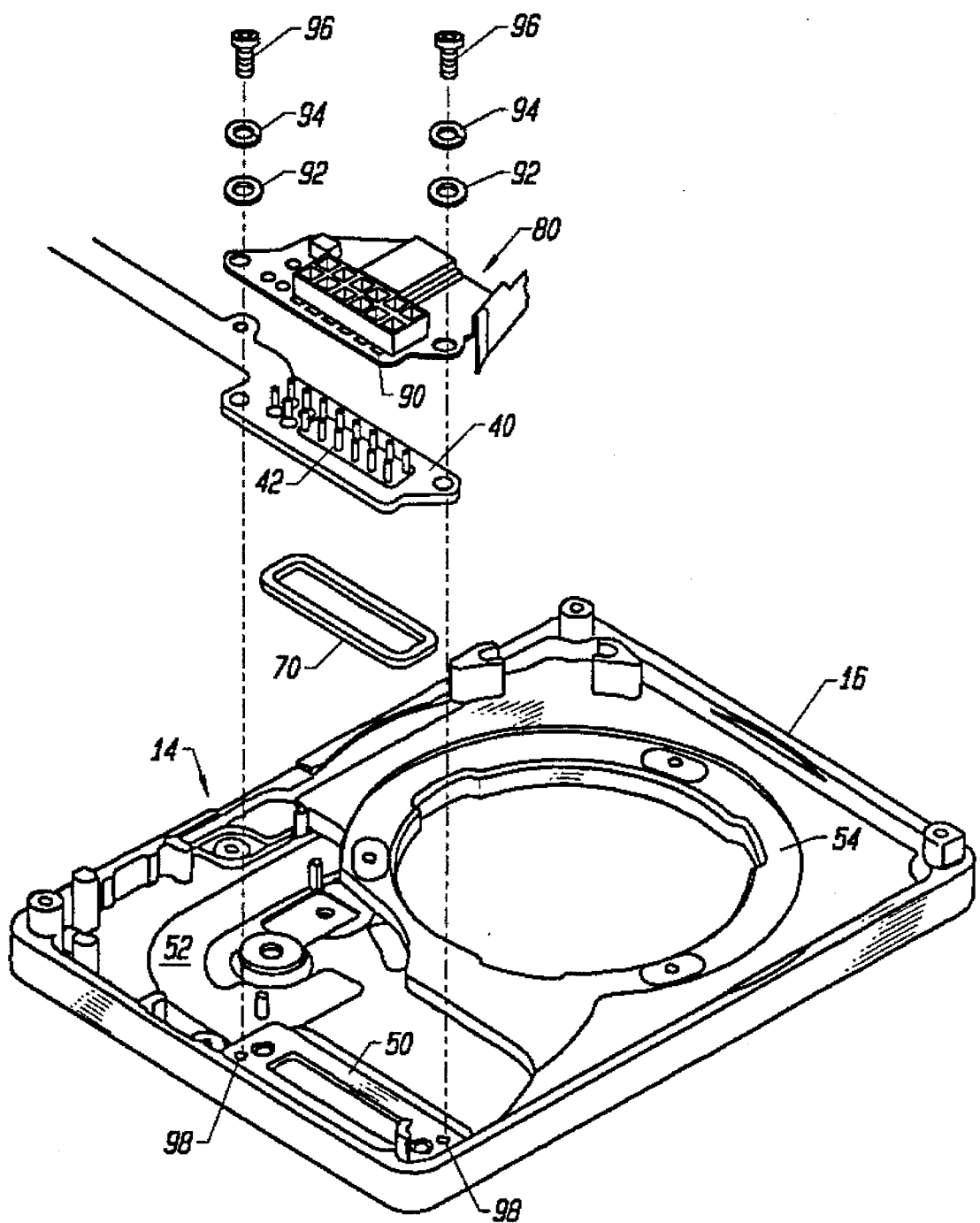
FIG. 2 is an exploded perspective view illustrating a portion of a disc drive unit including the a spindle motor printed circuit cable which may be mounted within the disc drive in accordance with the present invention.
Figure 3:
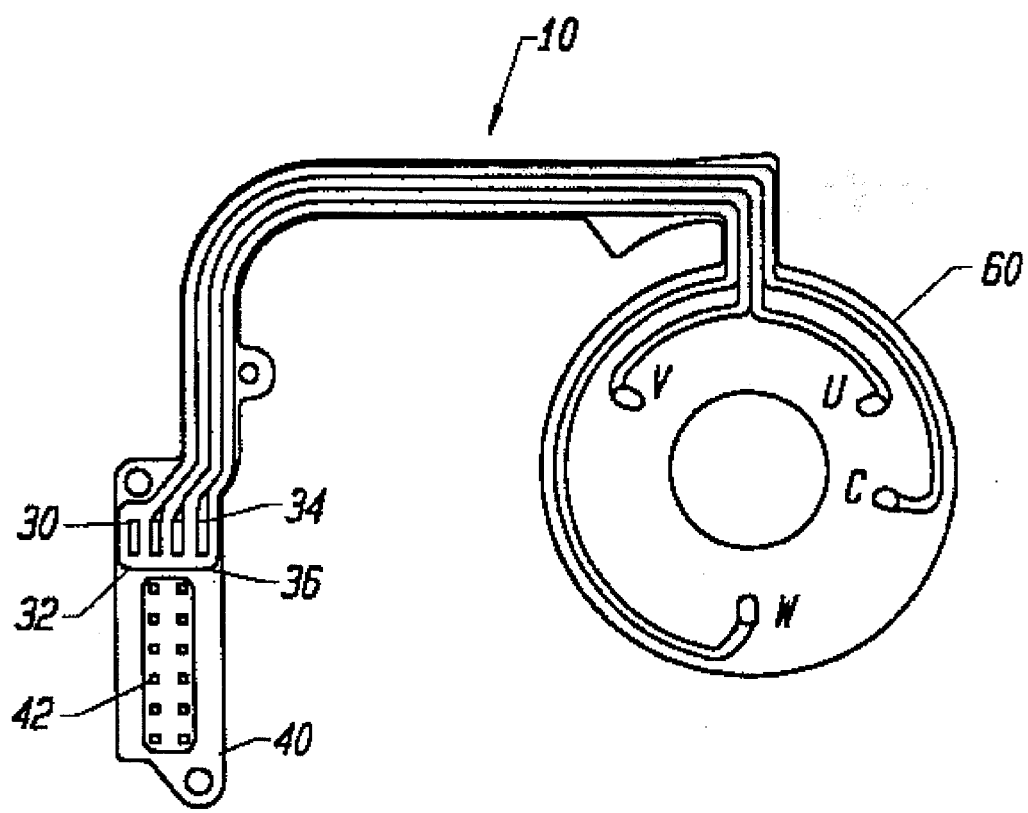
FIG. 3 is a top plan view of the spindle motor printed circuit cable of the present invention.

As shown in the exemplary drawings, an improved disc drive apparatus and method of assembly is provided by providing the improved spindle motor printed circuit cable indicated generally by the reference numeral 10 in FIGS. 2 and 3. The printed circuit cable and header arrangement and spindle motor attachment portion provide a simple, compact and economical component geometry for easy connection of a plurality of spindle motor leads leading from the spindle motor 12 to drive electronics external to the disc drive housing and not shown in the figure. The cable of the present invention is adapted to be incorporated in the disc drive especially through an automated method as will be described below.

Figure 1:
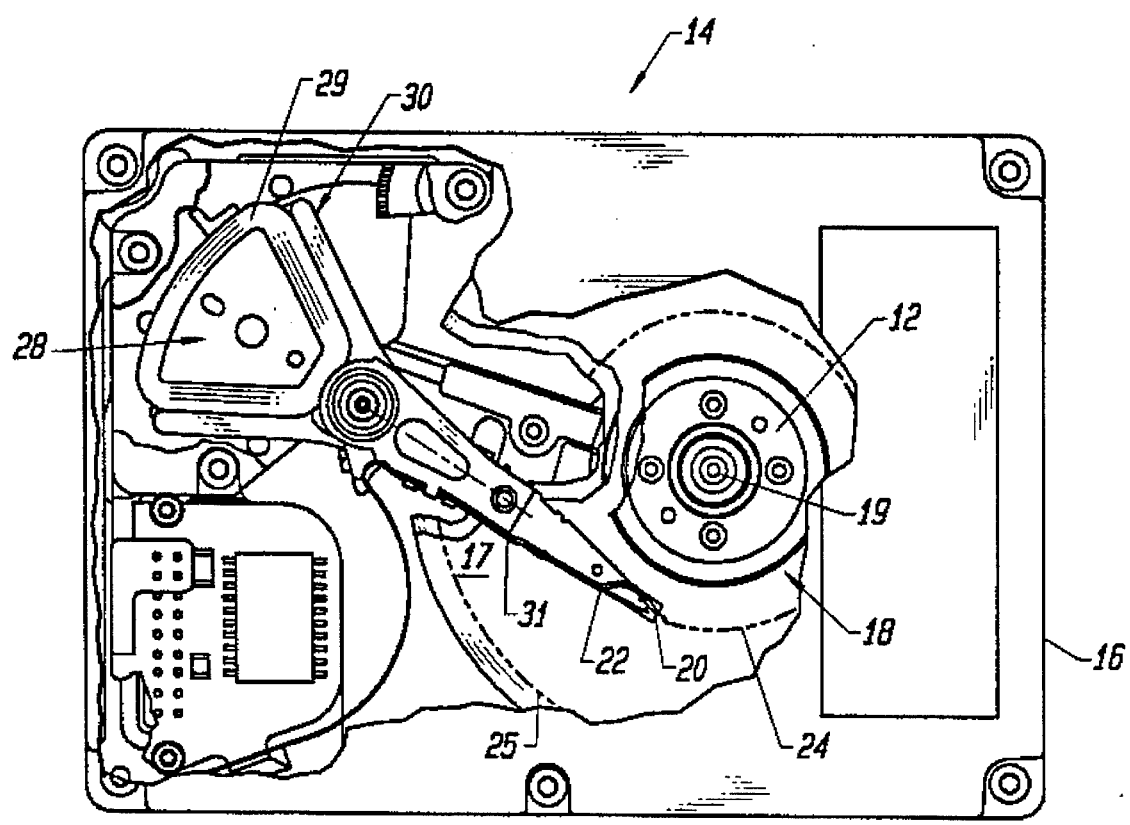
FIG. 1 is a top plan view illustrating portions of a typical disc drive unit within which the present invention is incorporated.

Turning now to FIG. 1, the illustrative disc drive unit 14 is of generally standard construction except for the features to be pointed out below. The disc drive is known in the computer industry to include a substantially sealed disc drive housing. This housing normally comprises a mating pair of housing sections, only one of which, the bottom or base section 16, is shown in this application. The disc or discs are rotatably supported from the base casting 16 by a disc drive spindle motor generally indicated at 18. The disc or discs generally indicated at 17 are supported within the housing 16 by a disc drive spindle motor whose axis appears at 19. In this way the rotating discs are operatively associated with one or more electromagnetic heads (also not shown) which are utilized to read and/or write data, all in a manner known to those skilled in the art. The heads are supported at the end 20 of a movable actuator arm 22 for selective location of the heads over any track (e.g. 24 on the surface of the disc) in response to controlled energization of the voice coil motor 28 supported on the distal end 30 of the actuator arm from the heads.

The spindle motor conventionally includes a group or plurality of spindle motor leads (not shown) which terminate at defined locations at the base of the spindle motor. These spindle motor leads are electrically connected to appropriate standardized individual terminal locations marked U, C, V and W (FIG. 3) of a connector fitting which is adapted to simply mate with the spindle motor leads as they terminate at the base of the spindle motor. As appears in FIG. 3, these leads are then brought out through the cable generally indicated at 10 to the pin connectors 30, 32, 34, 36. These pins and the board 40 to which the cable and its pins are attached, provide convenient mounting substrate for quickly connecting the spindle motor leads and other internal connections of the disc drive to electronics external to the disc drive required to rotatably drive the spindle motor and operate other components of the disc drive unit 10.

The circuit board which is mounted on the bottom of the housing base 16 is normally assembled with the drive housing to form the complete disc drive unit 14. Other interface connectors are provided on the header 40 for connection to other computer system components. These connections are provided through the remaining pins collectively indicated at 42 on FIGS. 2 and 3. These pins as well as the spindle motor circuit termination pins 30, 32, 34, 36 extend both above and below the header. By extending these connecting pins 30–36 and 42 below the header 40, and thereby below the base 16 of the disc drive housing 14, all connections between the sealed environment within the disc drive and the printed circuit board on the bottom of the base and the electrical components that it supports are provided by the header pins. The pins extending below the base plate typically engage rear entry connectors on the printed circuit assembly, which is utilized in a manner which is well known in this technology so that integrated and discrete circuit components and surface wirings on the printed circuit board may be located on the side of the printed circuit assembly facing away from the base plate 16. The header pins 30, 32, 34, 36, 42 extending above the base plate provide for connections to electrical components within the disc drive. Further, they are easily accessible during assembly of the disc drive before the housing cover is put in place, so that the spindle motor may be selectively activated by supplying appropriate control signals to pins 30, 32, 34, 36 to allow for testing of the spindle motor and other electrically energized components of the disc drive before final assembly and sealing of the sealed environment of the disc drive.

Referring again to FIG. 3 and to FIG. 2, the flexible spindle motor cable 10 of the present invention comprises a short and substantially flat segment of flexible ribbon cable adapted to facilitate connections by soldering or the like of the spindle motor leads U, C, V and W to the pins 30, 32, 34, 36 on the header 40 and the automated assembly of the header 40 into the base housing 16. In a preferred embodiment, the header 40 rests on a shelf 50 which is raised slightly above the floor of the base casting. The base housing in addition to the shelf 50 includes a recess region 52 which is shaped to match the curvature of the flexible motor cable 10 in order to define and confine its path from the mounting region of the header 40 to the mounting region 54 of the spindle motor. Thus, the recess 52 curves around from the header shelf to the spindle motor mount 54, where the circular region that supports the attachment ends of the spindle motor control leads is positioned.

As best shown in FIG. 3, the flexible cable 10 is installed in a curved fashion resting on the floor of the housing 16 with an in-board end segment 60 supporting connector ends C, U, V and W disposed in a circular array in close proximity with the typical exit point of the spindle motor leads (not shown). The flexible cable 10 can be oriented to present the termination points of the spindle motor control leads either upward or downward depending on the assembly of the spindle motor. In this way, they are easily accessible with a soldering tool or the like to attach the connectors to the ends of the spindle motor control leads.

Figure 4A:
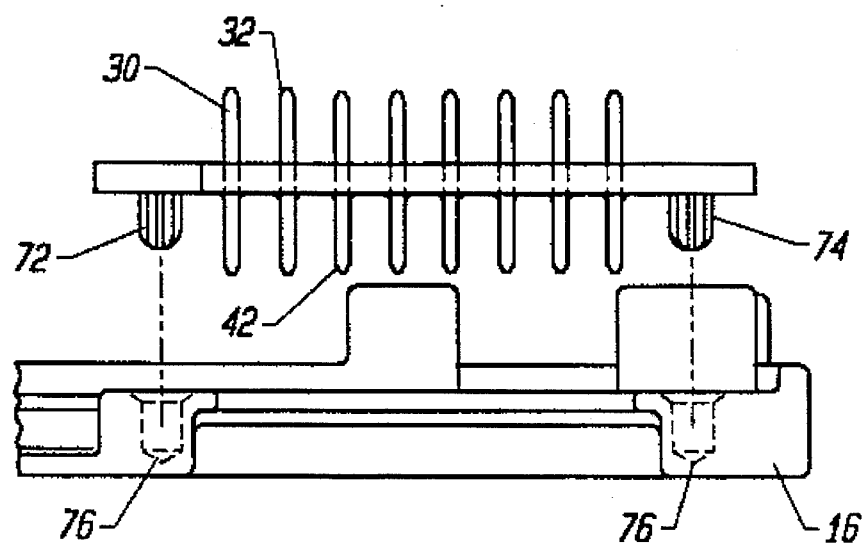
FIGS. 4A and 4B are front and side elevational views of the header portion of the spindle motor printed circuit cable designed in accordance with the present invention showing the physical relationship of the header and connecting pins and supports and the locating pins in association with the base housing casting.
Figure 4B:
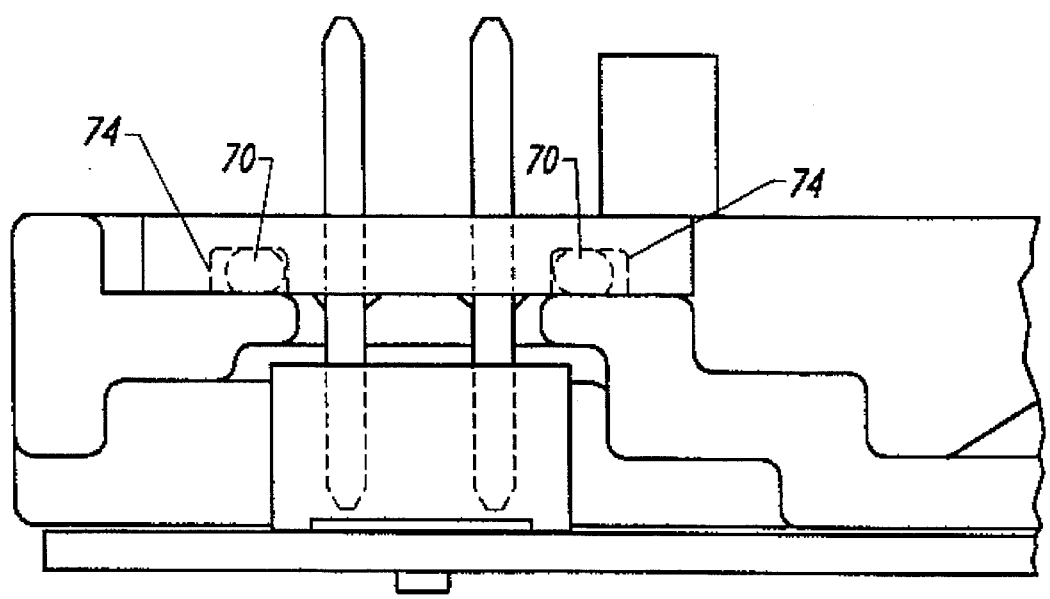

The main length of the flexible cable follows a curved path to lie on the recess 52 to avoid the actuator motor pivot support 61 and present the header 40 to the shelf 50. As shown in FIG. 2, and more clearly in FIGS. 4A and 4B, the header supports a plurality of pins 42 which extend both above and below the plane of the header 40. Additionally, a gasket 70 is provided which (see FIG. 4B) fits into a recess in the header 40. Finally, the header includes a pair of locating pins 72, 74, preferably one at each end of the header. These pins are positioned to mate with locating holes 76, 78 formed in the shelf which is a part of the housing 16.

During assembly, the gasket is inserted in the recess 74 surrounding the pins on the header 40, and the header and gasket assembly is placed on the shelf 50, accurately located thereon by virtue of the fit of the locating pins 72, 74 into the recesses 76.

To complete the assembly (looking at FIG. 2), a printed circuit cable bringing the leads from the actuator whose end section is designated generally at 80, is placed over the top of the header 40, with the pins 40 extending up through openings 90 in this cable termination 80. Washers 92, 94 and screws 96 are then put in place and threaded into holes 98 in the shelf 50. Thus, the two screws secure in place the header 80 of the read/write circuit cable, the header 40 of the spindle motor printed circuit cable, and provide any necessary grounding effect between these cable headers 40, 80, and the base casting of the disc drive.

The design of the present invention is especially adaptable to automated assembly of the cables incorporated in a disc drive. During the assembly of the disc drive, manufacturing testing requires access to the control wires running to the spindle motor to power the spindle motor. Having the header attached to the spindle printed circuit cable reduces the number of necessary steps in incorporating the spindle motor controls into the disc drive. The use of the plastic pins 72, 74 on the header provides a locating feature for the header to facilitate an automated assembly for the header 40 and to the disc drive, as well as providing a retention force used to secure the header 40 to the base 16. During the manufacturing process, the spindle control pins 30, 32, 34, 36 will be accessible from both sides of the base casting; thus the spindle motor is fully functional, power can be provided to the coils through the spindle motor control wire pins.

Further, providing a gasket incorporated in a recess on the underside of the spindle motor header will provide the sealing necessary to seal the head disc assembly from the outside environment. In completing the assembly, the spindle motor header is retained in place by the frictional force of the pins 72, 74 captured within recess 76. At the point where the head actuator arm and its printed circuit cable are merged and attached, the read/write cable header 80 is easily secured in place and aligned, and the screws which are threaded through the header 80 and header 40 into the shelf 50 of base 16 provide any necessary grounding as well as sealing the gasket tightly against base 16.

The assembly method and sequence followed herein requires no adhesive to butt the header to the base, a highly desirable aspect of the invention, as adhesive does cause out gassing into the surrounding atmosphere. Further, the spindle motor/header cable 40 can be easily grasped and assembled in place by a robot, allowing for a highly automated manufacturing sequence.

Other features and advantages of the present invention will be apparent to those skilled in the art from the description of the preferred embodiment above. Thus, the following claims are intended to cover modifications and equivalents falling within the scope of the invention.

What is claimed is:

1. A disc drive comprising:

a base plate having top and bottom surfaces, a spindle motor supported on said base plate, a rotatable disc supporting on said motor for rotation, means for supplying control signals to said spindle motor comprising a flat, flexible cable terminating in a header at a first end, said header comprising motor lead connector pins connected to wires running through said cable, said pins being adapted to be connected to phase lead wires of said spindle motor, said header pins extending both above said top surface and below said bottom surface of said base plate, said header further comprising first and second alignment pins extending below said header and sized to interface with apertures in said base plate whereby said header is aligned with said base plate by said alignment pins, said header further comprising a channel encircling a connector portion of said header comprising said pins, and a gasket located in said channel and pressed between said header and said base plate to seal the interior of said disc drive.

2. A disc drive as claimed in claim 1 wherein the size of said apertures in said base plate is sufficiently small relative to the size of said pins that said header is retained in said base plate by the fit of said pins into said apertures.

3. A disc drive as claimed in claim 1 including a transducer supported on an actuator arm pivotally mounted adjacent said disc and responsive to signals to a voice coil motor to position said transducer on the surface of said disc and wherein said connector portion of said header further comprises signal connector pins in said region defined by said gasket and adjacent to said motor lead connector pins connected to said spindle motor, said pins extending above said top surface and below said bottom surface of said base plate and capable of connection to carry signals to and from said transducer.

4. A disc drive as claimed in claim 3 further comprising a curved channel in said base plate running from a region adjacent said header to a region adjacent said actuator arm whereby said connector is easily and reliably incorporated into said disc drive base.

5. A disc drive as claimed in claim 4 wherein said disc drive further includes a shelf raised slightly above the floor of the base casting and located adjacent said curved recess for said connector, so that said connector is easily located on said shelf and extends through said curved region in said base.

6. A connector especially adapted for automated assembly for connecting a spindle motor to external electronics to rotatably drive the spindle motor by control signals delivered over electrical lines included in said connector, the connector comprising a sheath of flexible insulating material substantially surrounding said electrical lines as a unit and terminating at a first end at an inboard end segment supporting connector ends for connection to spindle motor leads, said flexible material connector terminating at a second end in a header comprising a plurality of motor lead connector pins extending both above and below the plane of said header, said header further comprising first and second alignment pins extending below a lower surface of said header and sized to interface with apertures in a base for supporting said header whereby said header is aligned with said base plate by said alignment pins and maintained in position therein so that said pins attached to the lines running to said spindle motor are easily accessible from both above and below said base for energizing and testing said motor during assembly and testing of a disc drive incorporating said connector said header further comprising a channel defined in said underside of said header and surrounding said region where said pins emerge below said header, and a gasket located in said channel and pressed between said header and said base plate to seal said header against said base plate in forming said assembly.

7. A connector as claimed in claim 6 wherein said header comprises a channel running around said underside of said header and surrounding said region where said pins emerge below said header, and a gasket located in said channel and pressed between said header and said base plate to seal said header against said base plate in forming said assembly.

8. A connector as claimed in claim 7 wherein said header further comprises a second plurality of signal connector pins adjacent said motor lead connector pins and within said region defined by said gasket, said pins extending above said top surface and below said bottom surface of said header and capable of connection to sources of and destinations for signals to and from a transducer operating in the region near said spindle motor.

* * * * *